UNITED STATES PATENT OFFICE.

CARL BENSINGER, OF MANNHEIM, GERMANY.

PROCESS FOR THE MANUFACTURE OF GALVANIC METAL REPRODUCTIONS OF ARTICLES OF THE PLASTIC ARTS.

1,023,612. Specification of Letters Patent. Patented Apr. 16, 1912.

No Drawing. Application filed September 4, 1908. Serial No. 451,750.

*To all whom it may concern:*

Be it known that I, CARL BENSINGER, of Mannheim, Germany, a subject of the Grand Duke of Baden, and whose post-office address is L. 11, 17, Mannheim, in the Grand Duchy of Baden, German Empire, have invented a new and useful Improved Process for the Manufacture of Galvanic Metal Reproductions of Articles of the Plastic Arts; and I do hereby declare that the following is a full, clear, and exact description of my invention, which will enable others skilled in the art to which it appertains to make and use the same.

The method of manufacturing metal articles by the galvanoplastic process necessitates, as first and most important stage of work, some suitable material which has to receive first the outward form of the article to be manufactured and then the metal covering in the galvanic bath.

The manufacturers of galvanoplastic wares have never been able to find in one material all the qualities demanded and the reproductions have suffered severely under this difficulty; thus plaster of Paris has among its many good points the very objectionable feature of absorbing the acids of the bath and is so breakable that the protruding parts of a figure or group of figures are in great danger of breaking.

Glue and gelatin change their form too much in drying and in the plastic state they are not rigid enough to support the metal. All materials did not transmit the fine lines of the original closely enough so that an engraver had to finish the galvanized piece thereby interfering with the individuality of the original artist.

I might say that the splendid properties of the galvanic current could not be brought to their highest effect for want of a suitable receiving material, and this material I claim to have found in celluloid.

Celluloid has the following advantages:—
(1.) It can be pressed or blown in any desired shape and gives an absolutely true reproduction of the original. (2.) The celluloid figure being hollow and very thin is very light and easily handled. (3.) Celluloid is acid-proof, unbreakable and unchangeable, and can, if it is desired, be easily removed out of the finished article by help of dissolving agents or fire.

The process of galvanizing with the help of celluloid is carried out as follows:—The selected model is divided into any number of parts so that all the undercut lines of the original can be reproduced, there being no limit to the number of these parts, and a suitable mold is made in order to blow or press these pieces out of celluloid. The hollow celluloid patterns thus produced are then united or joined, which is easily done owing to the great adhesiveness of celluloid, so that we have an exact copy of the original. The seams and joints are scraped and finished and the figure is coated with the usual conducting substance and the whole is then put into the bath. The galvanic deposit may be produced on the inside or outside or on both sides of the celluloid pattern, and if it is desired I can dissolve or burn out the celluloid after the metal coating is complete, leaving then solely a metallic copy of the original. In this manner I can produce thousands of copies all absolutely true to the original at a cost much lower than it has been done so far, and further obtain much better interpretations of the artist's idea and handwork than have hitherto been possible.

Having fully described my invention, what I desire to claim and secure by Letters Patent of the United States is:—

The hereindescribed process for the manufacture of galvanic reproductions of articles of the plastic art, which consists in dividing the selected model, making suitable molds from the parts thereof, blowing celluloid in these forms to produce a plurality of partial patterns of celluloid, uniting these celluloid parts to form a complete copy of the original, then coating said copy with a conducting substance and electro-depositing metal on the said conducting coating.

In testimony whereof I have hereunto set my hand in presence of two subscribing witnesses.

CARL BENSINGER.

Witnesses:
W. KLEOWEHN,
F. E. KEIPP.